United States Patent
Prati et al.

(10) Patent No.: US 11,280,611 B2
(45) Date of Patent: Mar. 22, 2022

(54) MICROELECTROMECHANICAL GYROSCOPE FOR SENSING ANGULAR RATE AND METHOD OF SENSING ANGULAR RATE

(71) Applicant: STMICROELECTRONICS S.R.L., Agrate Brianza (IT)

(72) Inventors: Daniele Prati, Catania (IT); Carlo Valzasina, Gessate (IT); Luca Giuseppe Falorni, Limbiate (IT); Matteo Fabio Brunetto, Legnano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 118 days.

(21) Appl. No.: 16/696,709

(22) Filed: Nov. 26, 2019

(65) Prior Publication Data

US 2020/0109946 A1    Apr. 9, 2020

Related U.S. Application Data

(63) Continuation of application No. 15/858,909, filed on Dec. 29, 2017, now Pat. No. 10,539,420, which is a continuation of application No. 14/964,347, filed on Dec. 9, 2015, now Pat. No. 9,869,550.

(30) Foreign Application Priority Data

Apr. 24, 2015 (IT) .................. 102015000013011

(51) Int. Cl.
*G01C 19/5733* (2012.01)
*G01C 19/5747* (2012.01)
*G01C 19/5762* (2012.01)

(52) U.S. Cl.
CPC ..... *G01C 19/5733* (2013.01); *G01C 19/5747* (2013.01); *G01C 19/5762* (2013.01)

(58) Field of Classification Search
CPC .. G01C 19/56; G01C 19/5733; G01C 19/574; G01C 19/5747; G01C 19/5762; G01C 19/5684
See application file for complete search history.

(56) References Cited

U.S. PATENT DOCUMENTS

| 5,728,936 | A | * | 3/1998 | Lutz | ................... | G01C 19/5747 73/504.12 |
| 6,691,571 | B2 | | 2/2004 | Willig et al. | | |
| 8,789,416 | B2 | | 7/2014 | Rocchi | | |

(Continued)

FOREIGN PATENT DOCUMENTS

| CN | 102183246 A | 9/2011 |
| CN | 102334010 A | 1/2012 |

*Primary Examiner* — Benjamin R Schmitt
(74) *Attorney, Agent, or Firm* — Seed Intellectual Property Law Group LLP

(57) ABSTRACT

A microelectromechanical gyroscope includes: a substrate; a stator sensing structure fixed to the substrate; a first mass elastically constrained to the substrate and movable with respect to the substrate in a first direction; a second mass elastically constrained to the first mass and movable with respect to the first mass in a second direction; and a third mass elastically constrained to the second mass and to the substrate and capacitively coupled to the stator sensing structure, the third mass being movable with respect to the substrate in the second direction and with respect to the second mass in the first direction.

19 Claims, 3 Drawing Sheets

(56) References Cited

U.S. PATENT DOCUMENTS

2004/0069062 A1    4/2004   Cho
2006/0033588 A1    2/2006   Caminada et al.
2007/0131030 A1    6/2007   Jeong et al.
2012/0061172 A1    3/2012   Yacine
2012/0291548 A1   11/2012   Kanemoto
2014/0116135 A1    5/2014   Cazzaniga et al.
2014/0144230 A1    5/2014   Magnoni et al.

* cited by examiner

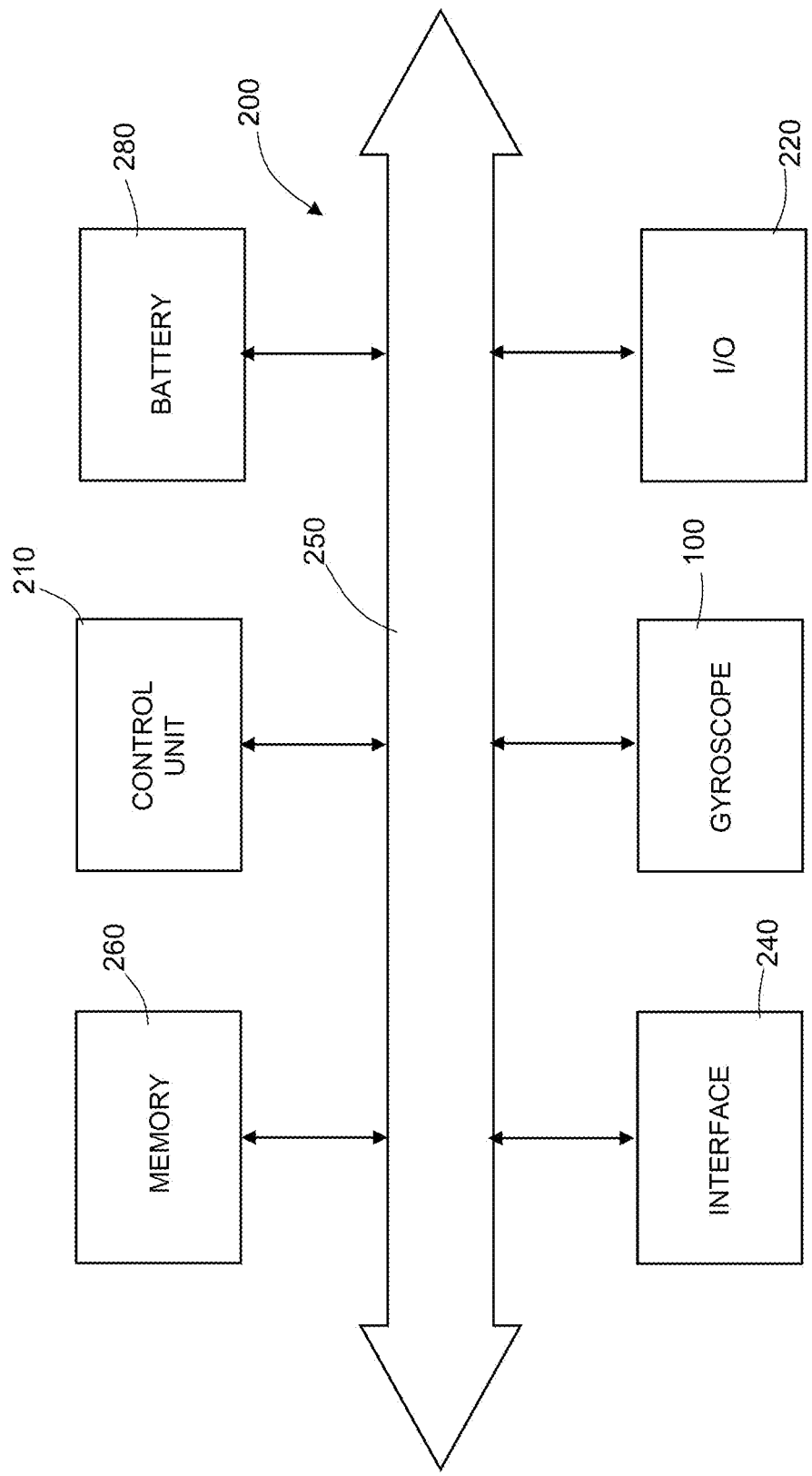

MICROELECTROMECHANICAL GYROSCOPE FOR SENSING ANGULAR RATE AND METHOD OF SENSING ANGULAR RATE

BACKGROUND

Technical Field

The present disclosure relates to a microelectromechanical gyroscope for sensing angular rate and to a method of sensing angular rate.

Description of the Related Art

As is known, use of microelectromechanical systems (MEMS) is increasingly widespread in various sectors of technology and has yielded encouraging results especially in the production of inertial sensors, microintegrated gyroscopes, and electromechanical oscillators for a wide range of applications.

In particular, there exist various types of MEMS gyroscopes, which are distinguished by their rather complex electromechanical structure and by the operating mode, but are in any case based upon detection of Coriolis accelerations. In MEMS gyroscopes of this type, a mass is elastically constrained to a substrate or stator to be able to translate in a driving direction and a sensing direction that are mutually perpendicular. By a control device, the mass is set in oscillation at a controlled frequency and amplitude in the driving direction.

When the gyroscope turns about an axis perpendicular to the driving direction and to the sensing direction at an angular rate, on account of the motion in the driving direction, the mass is subject to a Coriolis force and moves in the sensing direction. The displacements of the mass in the sensing direction are determined both by the angular rate and by the velocity in the driving direction and may be transduced into electrical signals. For instance, the mass and the substrate may be capacitively coupled so that the capacitance depends upon the position of the mass with respect to the substrate. The displacements of the mass in the sensing direction may thus be detected in the form of electrical signals modulated in amplitude in a way proportional to the angular rate, with carrier at the frequency of oscillation of the driving mass. Use of a demodulator makes it possible to obtain the modulating signal thus to derive the instantaneous angular rate.

In many cases, however, the acceleration signal that carries information regarding the instantaneous angular rate also contains spurious components that are not determined by the Coriolis acceleration and thus present in the form of disturbance. Not infrequently, for example, the spurious components may depend upon constructional imperfections of the micromechanical part, due to the limits of precision and to the production process spread. Typically, the effective oscillatory motion of the driving mass, as a result of a defect in the elastic constraints provided between the mass and the substrate, may be misaligned with respect to the direction expected theoretically. This type of defect commonly causes a quadrature signal component, which adds to the useful signal due to rotation of the microstructure. Like the Coriolis force, in fact, the misalignment causes the mass to displace also in the sensing direction, instead of just in the driving direction, and produces a variation of the capacitance between the mass and the substrate.

Obviously, the consequences are a degraded signal-to-noise ratio and an altered dynamic of the read interface, at the expense of the signal to be read, to an extent that depends upon the degree of the defects.

BRIEF SUMMARY

One or more embodiments of the present disclosure are directed to a microelectromechanical gyroscope and a method of sensing angular rates.

According to one embodiment of the present disclosure, a microelectromechanical gyroscope includes a substrate and a stator sensing structure fixed to the substrate. The gyroscope further includes a first mass elastically coupled to the substrate and movable with respect to the substrate in a first direction and a second mass elastically coupled to the first mass and movable with respect to the first mass in a second direction. The gyroscope includes a third mass elastically coupled to the second mass to enable movement in the first direction and elastically coupled to the substrate to enable movement in the second direction, the third mass being capacitively coupled to the stator sensing structure.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIG. 4 is a simplified block diagram of an electronic system incorporating a microelectromechanical gyroscope according to the present disclosure.

DETAILED DESCRIPTION

Figure 1:
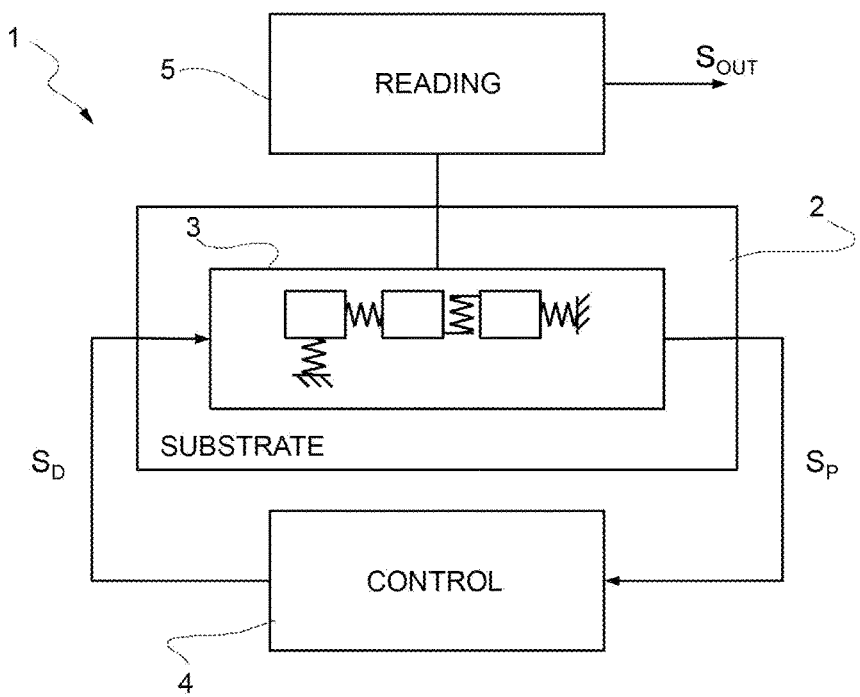
FIG. 1 is a simplified block diagram of a microelectromechanical gyroscope according to an embodiment of the present disclosure.

With reference to FIG. 1, a microelectromechanical gyroscope according to an embodiment of the present disclosure is designated as a whole by the number 1 and comprises a substrate 2, a microstructure 3, a control device 4, and a read device 5. As explained in detail hereinafter, the microstructure 3 comprises movable parts and parts that are fixed with respect to the substrate 2. The control device 4 forms a control loop with the microstructure 3 and is configured to keep movable parts of the microstructure 3 in oscillation with respect to the substrate with controlled frequency and amplitude. For this purpose, the control device 4 receives position signals Sp from the microstructure 3 and supplies driving signals $S_D$ to the microstructure 3. The read device 5 supplies output signals $S_{OUT}$ as a function of the movement of the movable parts of the microstructure 3. The output signals $S_{OUT}$ indicate an angular rate of the substrate 2 with respect to a gyroscopic axis of rotation.

Figure 2:
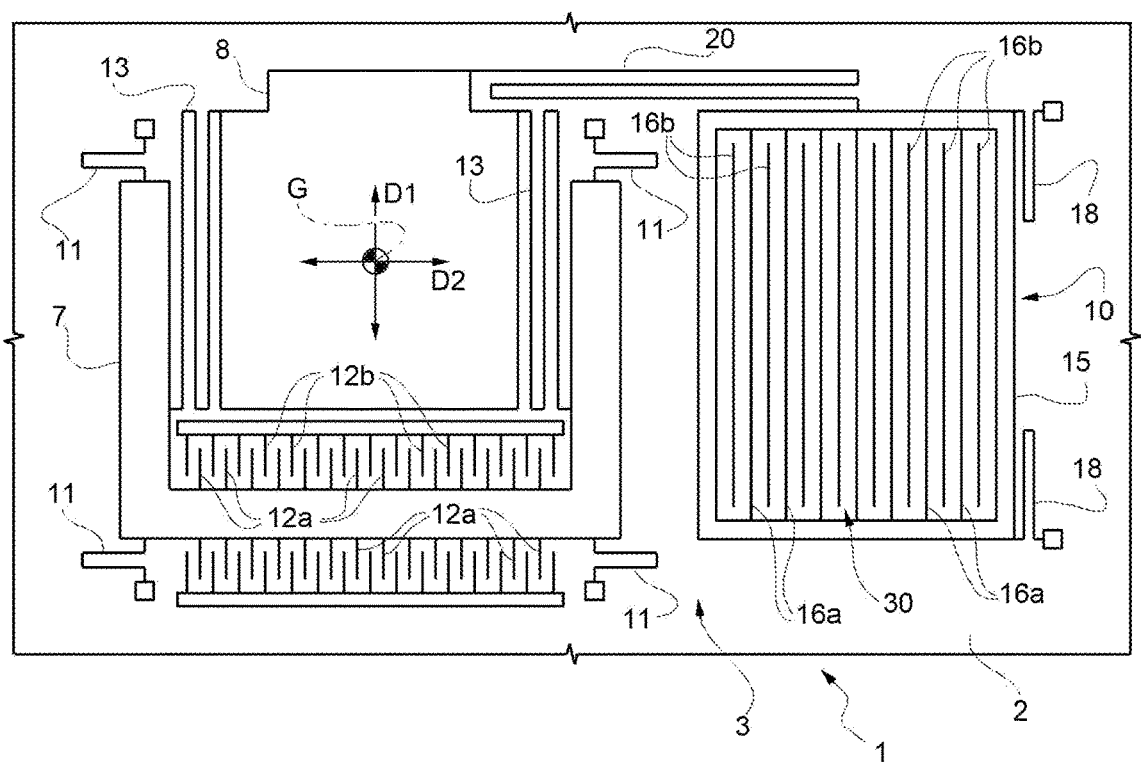
FIG. 2 is a simplified top plan view of a portion of the microelectromechanical gyroscope of FIG. 1.

Illustrated in FIG. 2 are the substrate 2 and, in greater detail, the microstructure 3 according to one embodiment. In particular, the microstructure 3 comprises a driving mass 7, a transduction mass 8, and a movable sensing structure 10.

The driving mass 7 is elastically constrained to the substrate 2 and is movable with respect to the substrate 2 in a driving direction D1. In use, the control device 4 keeps the driving mass 7 in oscillation in the driving direction D1 about a resting position. For this purpose, the control device 4 uses movable driving electrodes 12a, fixed to the driving mass 7, and stator driving electrodes 12b, fixed to the substrate 2. The movable driving electrodes 12a and the stator driving electrodes 12b are capacitively coupled in comb-fingered configuration and are substantially parallel to the driving direction D1. The stator driving electrodes 12b receive the driving signals $S_{OUT}$ from the control device 4 through electrical-connection lines (not illustrated for reasons of simplicity). The oscillations of the driving mass 7 define a signal carrier for the transduction chain of the gyroscope 1.

The elastic connection of the driving mass 7 to the substrate 2 is obtained by elastic suspension elements 11 or "flexures", which are configured to enable oscillations of the driving mass 7 with respect to the substrate 2 in the driving direction D1 and to prevent other movements of the driving mass 7, in particular in a transduction direction D2 perpendicular to the driving direction D1. Here and in what follows, the expression "prevent movements in a direction" and similar expressions, both in reference to the driving direction D1 and in reference to the transduction direction D2 or in any other direction, are to be understood in the sense of substantially limiting the movements in said direction, compatibly with what is allowed by the technological and geometrical limits in definition of the constraints. It is thus not to be understood that the expressions referred to are in contradiction with the presence of possible spurious movements in the forbidden directions that may be at the origin of signals of disturbance with respect to the carrier defined by the oscillations of the driving mass, but these movements are only ideally prevented by the specific configuration of the flexible elements and constraints that are practically rigid in these directions.

The transduction mass 8 is elastically constrained to the driving mass 7 and is movable with respect to the driving mass in the transduction direction D2.

The elastic connection of the transduction mass 8 to the driving mass 7 is obtained by elastic suspension elements 13, which are configured to enable oscillations of the transduction mass 8 with respect to the driving mass 7 in the transduction direction D2 and prevent other relative movements of the transduction mass 8 with respect to the driving mass 7, in particular in the driving direction D1. With respect to the substrate 2, instead, the transduction mass 8 is movable both in the transduction direction D2 and also in the driving direction D1 as a result of the drawing action of the driving mass 7 and of the constraint imposed by the elastic suspension elements 13.

The movable sensing structure 10 comprises a frame 15 and a set of movable sensing electrodes 16a, which are supported by the frame 15 and extend parallel to the driving direction D1. The frame 15 is elastically constrained to the transduction mass 8 and to the substrate 2. With respect to the substrate 2, the frame 15 is movable in the transduction direction D2. With respect to the transduction mass 8, the frame 15 is movable in the driving direction D1.

Elastic connection of the frame 15 to the substrate 2 is obtained by elastic suspension elements 18, which are configured to enable oscillations of the frame 15 with respect to the substrate 2 in the transduction direction D2 and prevent other movements of the frame 15 with respect to the substrate 2, in particular in the driving direction D1.

The frame 15 is coupled to the transduction mass 8 by elastic connection elements 20, which are configured to prevent relative movements between the transduction mass 8 and the frame 15 in the transduction direction D2. The elastic connection elements 20 enable, instead, other relative movements between the transduction mass 8 and the frame 15. In particular, translatory oscillations in the driving direction D1 and rotary oscillations are allowed. Consequently, the movements of the transduction mass 8 in the transduction direction D2 are transmitted substantially in a rigid way, whereas the translatory movements in the driving direction and the rotary movements of the transduction mass are at least in part compensated by the elastic connection elements 20. Due to the elastic connection elements 20, which enable displacements between the frame 15 and the transduction mass 8 in the driving direction D1, the frame 15 may be constrained to the substrate 2 as already described without cancelling out the useful displacement components due to the Coriolis force that acts on the transduction mass 8. This would not be possible with a simple rigid connection between the transduction mass 8 and the movable sensing structure 10.

The movable sensing structure 10 is capacitively coupled to a stator sensing structure 30, which comprises stator sensing electrodes 16b fixed to the substrate 2 and extending in the driving direction D1. In particular, the movable sensing electrodes 16a and the stator sensing electrodes 16b are coupled according to a "parallel plate" scheme and define a capacitor with a capacitance variable as a function of the position of the movable sensing structure 10 with respect to the substrate 2 in the transduction direction D2.

As mentioned, in use, the control device 4 keeps the driving mass 7 in oscillation in the driving direction D1 with controlled frequency and amplitude. The transduction mass 8 is drawn by the driving mass 7 in the motion in the driving direction D1 as a result of the connection by the elastic suspension elements 13, which enable relative motion between the driving mass 7 and the transduction mass 8 only in the transduction direction D2. When the substrate 2 turns about a gyroscopic axis G perpendicular to the driving direction D1 and to the transduction direction D2, the transduction mass 8 is subjected to a Coriolis force in the transduction direction D2. The transduction mass 8 thus oscillates in the transduction direction D2 with an amplitude that depends upon the linear drawing velocity in the driving direction D1 and by the angular rate of the substrate 2 about the gyroscopic axis G. A spurious displacement, caused by imperfections of the elastic suspension elements 11, may be added to the displacement due to the Coriolis force. The component due to the spurious displacement varies at the same frequency as that of the carrier, but is phase-shifted by 90° with respect to the Coriolis forcing term because it depends upon the position and not upon the velocity in the driving direction D1. The overall displacement of the transduction mass 8 in the transduction direction D2 is transmitted to the movable sensing structure 10 as a result of the elastic connection elements 20, which allow relative translatory motion only in the driving direction D1.

The effect of the imperfections of the constraints, in particular of the elastic suspension elements 11 that connect the driving mass 7 to the substrate 2 is, however, transferred to the movable sensing structure 10 to an extent much smaller than the contribution due to the Coriolis force. The contribution due to the defects of driving in the transduction direction D2 is thus attenuated for the transduction mass 8 and the sensing mass 10 both by the elastic suspension elements 13 between the driving mass 7 and the transduction mass 8 and by the elastic suspension elements 18 between the movable sensing structure 10 and the substrate 2, as well as by the elastic connection elements 20 between the transduction mass 8 and the frame 15. In particular, the elastic connection elements 20 are able to attenuate also spurious rotary movements, which are transmitted to the transduction mass 8 by the driving mass 7 and are not completely compensated for by the elastic suspension elements 13. Instead, the contribution due to the Coriolis force in the transduction direction D2 arises directly from the transduction mass 8 and is transmitted without appreciable attenuation by the elastic connection elements 20, which enable a substantially rigid coupling in the direction D2, and this contribution is affected the action of the elastic suspension elements 13 and of the elastic suspension elements 18 and is consequently transmitted in a non-attenuated way on the sensing mass 10. The Coriolis force on the driving mass 7 is, instead, completely balanced by the elastic suspension elements 11.

The weight of the spurious contributions is thus attenuated with respect to that of the contributions useful for detection of the angular rate, and the signal-to-noise ratio is accordingly improved.

Figure 3:
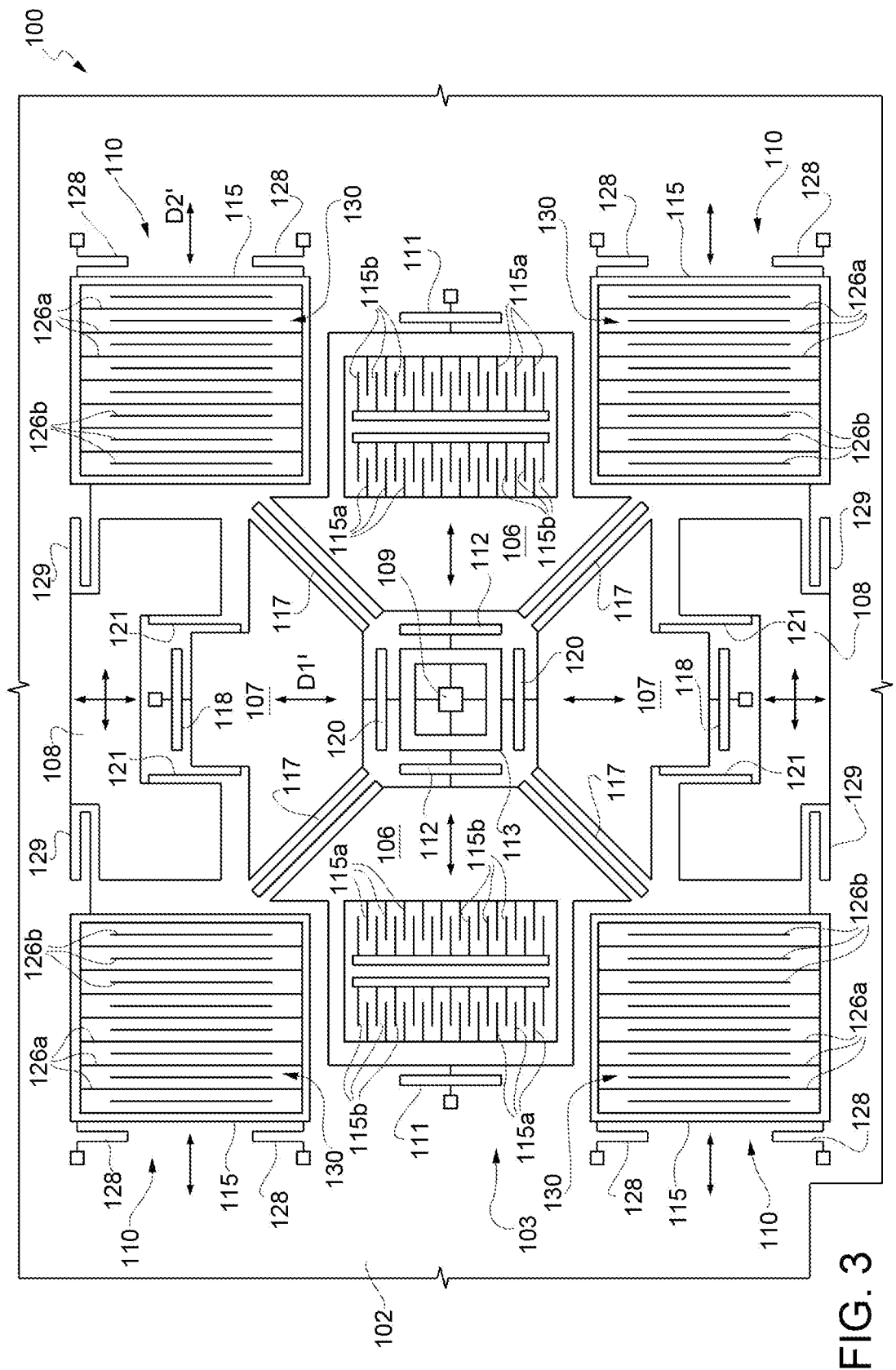
FIG. 3 is a simplified top plan view of a portion of a microelectromechanical gyroscope according to a different embodiment of the present disclosure.

FIG. 3 illustrates a different embodiment of the disclosure. In this case, a microelectromechanical gyroscope 100 comprises a substrate 102 and a microstructure 103, in addition to a control device and to a read device (not illustrated).

The microstructure 103 comprises two actuation masses 106, two driving masses 107, two transduction masses, and four movable sensing structures 110, all arranged symmetrically about a central anchorage 109.

In detail, the actuation masses 106 are arranged symmetrically with respect to the central anchorage 109 and are aligned in an actuation direction. The actuation masses 106 are elastically coupled to the substrate 102 for oscillating in a fixed actuation direction. Connection to the substrate 102 is obtained by elastic elements 111 for connection to respective outer ends. The actuation masses 106 are further coupled together through elastic connection elements 112 and a bridge 113, which is in turn connected to the central anchorage 109. The bridge 113 is defined by a frame surrounding the central anchorage 109 and connected thereto to be able to oscillate out of plane with respect to two perpendicular axes.

The actuation masses 106 are provided with respective sets of movable actuation electrodes 115a, which are capacitively coupled in comb-fingered configuration to stator actuation electrodes 115b fixed to the substrate 2. The control device (not illustrated) uses the movable actuation electrodes 115a and the stator actuation electrodes 115b for keeping the actuation masses 106 in oscillation with respect to the actuation direction with controlled frequency and amplitude and, for example, with a mutual phase shift.

The driving masses 107 are arranged symmetrically with respect to the central anchorage 109 and are aligned in a driving direction D1' perpendicular to the actuation direction. The driving masses 107 are elastically coupled to the substrate 102 and to the actuation masses 106 for oscillating in the driving direction D1'. In particular, each driving mass 107 is coupled to both of the actuation masses 106 by respective elastic suspension elements 117, which are configured to convert the motion of the actuation masses 106 in the actuation direction into motion of the driving masses 107 in the driving direction D1'. The mutually phase-shifted oscillatory motion of the actuation masses 106 in the actuation direction causes a corresponding mutually phase-shifted oscillatory motion of the driving masses 107 in the driving direction D1'.

The driving masses 107 are further coupled to the substrate 102 by elastic suspension elements 118 and to the bridge 113 by elastic connection elements 120. The elastic suspension elements 118 and the elastic connection elements 120 are configured to prevent movements of the driving masses 107 transverse to the driving direction D1'.

Each transduction mass 108 is elastically coupled to a respective one of the driving masses 107 by elastic connection elements 121. The transduction masses 108 are arranged symmetrically with respect to the central anchorage 109. The elastic connection elements 121 are configured to enable relative movements of the transduction masses 108 with respect to the driving masses 107 in a transduction direction D2' perpendicular to the driving direction D1' and for preventing relative movements of the transduction masses 108 with respect to the driving masses 107 in the driving direction D1' (in one embodiment, the transduction direction D2' is parallel to the actuation direction).

Coupled to each transduction mass 108 are two respective movable sensing structures 110 on opposite sides with respect to the transduction direction D2'.

Each movable sensing structure 110 comprises a frame 115 and a set of movable sensing electrodes 126a, which are supported by the respective frame 115. The frames 115 are elastically constrained to the respective transduction masses 108 and to the substrate 102 and are movable with respect to the substrate 102 in the transduction direction D2' and with respect to the respective transduction masses 108 in the driving direction D1'.

Elastic connection of the frames 115 to the substrate 102 is obtained by elastic suspension elements 128, which are configured to enable oscillations of the frames 115 with respect to the substrate 102 in the transduction direction D2' and prevent movements of the frames 115 with respect to the substrate 102 in the driving direction D1'.

Elastic connection of the frames 115 to the respective transduction masses 108 is obtained by elastic suspension elements 129, which are configured to enable oscillations of the transduction masses 108 with respect to the respective frames 115 in the driving direction D1' and prevent relative movements between the frames 115 and the respective transduction masses 108 in the transduction direction D2'.

The movable sensing structures 110 are capacitively coupled to respective stator sensing structures 130, which comprise respective sets of stator sensing electrodes 126b fixed to the substrate 102. In particular, the movable sensing electrodes 126a and the stator sensing electrodes 126b are coupled according to a parallel-plate scheme and define a capacitor with capacitance variable as a function of the position of the movable sensing structures 110 with respect to the substrate 102 in the transduction direction D2'.

In the embodiment described, the actuation masses 106 and the driving masses 107 may be constrained to the substrate 102 so that respective out-of-plane rotary movements are allowed. In practice, the elastic connection elements of the actuation masses 106 and of the driving masses 107 may be configured to enable rotations about respective axes parallel to the driving direction D1' (for the actuation masses 106) or to the transduction direction D2' (for the driving masses 107). In this case, the actuation masses 106 and driving masses 107 may be capacitively coupled to electrodes (not illustrated) arranged on respective portions of the substrate 102. This makes it possible to provide multiaxial gyroscopes, which may detect rotations of the substrate 102 also with respect to axes parallel to the driving direction D1' or to the transduction direction D2' (in practice, parallel to the surface of the substrate 102).

Also in this case, the transduction masses 108 and the movable sensing structures 110 are separated from the driving masses 107 and coupled for penalizing transfer of the spurious movements (due to defects of the constraints) to the sensing structures. In particular, the result is favored by the elastic suspension elements 128 between the frames 115 and the substrate 102 and by the elastic suspension elements 129 between the transduction masses 108 and the respective frames 115.

Illustrated in FIG. 4 is a portion of an electronic system 200 according to an embodiment of the present disclosure. The system 200 incorporates the electromechanical transducer 1 and may be used in devices such as, for example, a laptop computer or tablet, possibly with wireless-connection capacity, a cellphone, a smartphone, a messaging device, a digital music player, a digital camera, or other devices designed to process, store, transmit, or receive information. In particular, the electroacoustic transducer 1 may be used for performing functions of voice control, for example, in a motion-activated user interface for computers or consoles for video games or in a satellite-navigation device.

The electronic system 200 may comprise a control unit 210, an input/output (I/O) device 220 (for example, a keyboard or a screen), the gyroscope 100, a wireless interface 240, and a memory 260, of a volatile or nonvolatile type, coupled together through a bus 250. In one embodiment, a battery 280 may be used for supplying the system 200. It should be noted that the scope of the present disclosure is not limited to embodiments necessarily having one or all of the devices listed.

The control unit 210 may comprise, for example, one or more microprocessors, microcontrollers and the like.

The I/O device 220 may be used for generating a message. The system 200 may use the wireless interface 240 for transmitting and receiving messages to and from a wireless-communication network with a radiofrequency (RF) signal. Examples of wireless interface may comprise an antenna, a wireless transceiver, such as a dipole antenna, even though the scope of the present disclosure is not limited from this point of view. Furthermore, the I/O device 220 may supply a voltage representing what is stored either in the form of digital output (if digital information has been stored) or in the form of analog information (if analog information has been stored).

Finally, it is evident that modifications and variations may be made to the microelectromechanical gyroscope and to the method described, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
a substrate;
a central driving system coupled to the substrate, the central driving system including a plurality of driving electrodes, a plurality of actuation masses, and a plurality of driving masses;
first and second transduction masses coupled to the central driving system, wherein the central driving system is configured to drive the first and second transduction masses;
first and second movable sensing structures coupled at opposing sides of the first transduction mass, the first and second movable sensing structures capacitively coupled to first and second stator sensing structures; and
third and fourth movable sensing structures coupled to opposing sides of the second transduction mass, the third and fourth movable sensing structures capacitively coupled to third and fourth stator sensing structures.

2. The microelectromechanical gyroscope of claim 1, wherein the plurality of driving electrodes are two sets of driving electrodes arranged on opposing sides of the plurality of actuation masses.

3. The microelectromechanical gyroscope of claim 2, wherein the plurality of driving masses are two actuation masses.

4. The microelectromechanical gyroscope of claim 1, wherein the plurality of driving masses are two driving masses and the plurality of actuation masses are two actuation masses.

5. The microelectromechanical gyroscope of claim 4, wherein the two driving masses are symmetrically arranged relative to a central axis, wherein the two actuation masses are symmetrically arranged relative to the central axis.

6. The microelectromechanical gyroscope of claim 4, wherein the two driving masses and the two actuation masses are anchored at a central axis.

7. The microelectromechanical gyroscope of claim 1, wherein the first and second transduction masses are not directly coupled to the substrate.

8. A microelectromechanical gyroscope, comprising:
a substrate;
a central driving system comprising:
first and second sets of driving electrodes coupled to the substrate; and
first, second, third, and fourth masses being configured to be driven by the first and second sets of driving electrodes, the first and second masses being driven along a first axis, the third and fourth masses being driven along a second axis, the second axis being transverse to the first axis;
first, second, third, and fourth movable sensing structures configured to sense a Coriolis force; and
first and second transduction masses coupled to the third and fourth masses, opposing ends of the first transduction mass directly coupled to the first and second movable sensing structures, opposing ends of the second transduction mass being directly coupled to the third and fourth movable sensing structures.

9. The microelectromechanical gyroscope of claim 8, wherein the first and second transduction masses are not directly coupled to the substrate.

10. The microelectromechanical gyroscope of claim 8, wherein the first and second movable sensing structures are capacitively coupled to first and second stator sensing structures; and
wherein the third and fourth movable sensing structures are coupled to opposing sides of the second transduction mass, wherein the third and fourth movable sensing structures are capacitively coupled to third and fourth stator sensing structures.

11. The microelectromechanical gyroscope of claim 8, wherein the first mass is directly coupled to the first set of driving electrodes and the second mass is directly coupled to the second set of driving electrodes.

12. The microelectromechanical gyroscope of claim 8, wherein the third mass is directly coupled to both the first and second masses and the fourth mass is directly coupled to both the first and second masses.

13. The microelectromechanical gyroscope of claim 8, wherein the second axis is perpendicular to the first axis.

14. The microelectromechanical gyroscope of claim 8, wherein the first, second, third, and fourth masses are arranged about a central axis.

15. A microelectromechanical gyroscope, comprising:
a substrate;
a central driving system comprising:
first and second sets of driving electrodes coupled to the substrate; and
first, second, third, and fourth central masses coupled to a central portion of the substrate, the first, second, third, and fourth central masses being configured to be driven by the first and second sets of driving electrodes, the first and second central masses being driven along a first axis, the third and fourth central masses being driven along a second axis, the second axis being transverse to the first axis;
first, second, third, and fourth movable sensing structures configured to sense a Coriolis force; and
first and second transduction masses coupled to the third and fourth central masses, respectively, opposing ends of the first transduction mass directly coupled to the first and second movable sensing structures, opposing ends of the second transduction mass being directly coupled to the third and fourth movable sensing structures.

16. The microelectromechanical gyroscope of claim 15, wherein the first and second sets of driving electrodes are located on opposing sides of the first and second central masses.

17. The microelectromechanical gyroscope of claim 15, wherein the first and second transduction masses are located on opposing sides of the third and fourth central masses.

18. The microelectromechanical gyroscope of claim 15, wherein the first and second central masses are configured to move along the first axis and the third and fourth central masses are configured to move along the second axis, the second axis being perpendicular to the first axis.

19. The microelectromechanical gyroscope of claim 15, wherein the first and second transduction masses are not directly coupled to the substrate.

* * * * *